US012797835B2

(12) United States Patent
Zhang et al.

(10) Patent No.: US 12,797,835 B2
(45) Date of Patent: Nov. 17, 2026

(54) Cu—Zn-SSZ-13 MOLECULAR SIEVE COMPOSITE CATALYST AND PREPARATION METHOD THEREOF

(71) Applicant: Shandong Hongtai Hengrui New Material Co., Ltd., Tai'an City (CN)

(72) Inventors: Dongdong Zhang, Tai'an City (CN); Dianmin Ma, Tai'an City (CN); Lei Wang, Tai'an City (CN); Jitao Zhang, Tai'an City (CN); Jiangang Sun, Tai'an City (CN); Li Wang, Tai'an City (CN); Jinhui Li, Tai'an City (CN); Lin Ma, Tai'an City (CN); Ran Ma, Tai'an City (CN)

(73) Assignee: SHANDONG HONGTAI HENGRUI NEW MATERIAL CO., LTD., Tai'an City (CN)

( * ) Notice: Subject to any disclaimer, the term of this patent is extended or adjusted under 35 U.S.C. 154(b) by 573 days.

(21) Appl. No.: 18/238,784

(22) Filed: Aug. 28, 2023

(65) Prior Publication Data

US 2024/0207829 A1 Jun. 27, 2024

(30) Foreign Application Priority Data

Dec. 22, 2022 (CN) ........................ 202211653966.6

(51) Int. Cl.
*B01J 29/76* (2006.01)
*B01D 53/86* (2006.01)
(Continued)

(52) U.S. Cl.
CPC .......... *B01J 29/76* (2013.01); *B01D 53/8628* (2013.01); *B01J 37/009* (2013.01); *B01J 37/031* (2013.01);
(Continued)

(58) Field of Classification Search
CPC ........... B01D 2255/20761; B01D 2255/20792; B01D 2255/50; B01D 2257/404;
(Continued)

(56) References Cited

FOREIGN PATENT DOCUMENTS

CN 108786900 A * 11/2018 ......... B01D 53/9413
CN 109534354 A * 3/2019 ............. C01B 39/04
(Continued)

OTHER PUBLICATIONS

He et al. CN108786900A English (Year: 2018).*
(Continued)

*Primary Examiner* — Sally A Merkling
*Assistant Examiner* — Jordan W Taylor
(74) *Attorney, Agent, or Firm* — Bay State IP, LLC

(57) ABSTRACT

The present disclosure relates to a Cu—Zn-SSZ-13 molecular sieve composite catalyst and a preparation method thereof. Firstly, in situ synthesis is conducted by an one-step method and the template agent TMAdaOH is removed. Then a processed diatomite filter aid containing a SSZ-13 molecular sieve seed is added to improve the molecular sieve yield and thus reduce the cost. Finally, the Cu—Zn-SSZ-13 molecular sieve composite catalyst is prepared by substituting ammonium nitrate with ammonium dihydrogen phosphate or diammonium hydrogen phosphate through a counter-ion exchange method. The reaction performance of the catalyst in a temperature range of 100-600° C. is better than that of a SSZ-13 catalyst prepared by an ion exchange method and a Cu-SSZ-13 molecular sieve catalyst prepared by an one-step method, and the yield of the synthetic object is increased by 40%.

9 Claims, 4 Drawing Sheets

(51) Int. Cl.

*B01J 37/00* (2006.01)
*B01J 37/03* (2006.01)
*B01J 37/04* (2006.01)
*B01J 37/30* (2006.01)
*B01J 37/34* (2006.01)
*C01B 39/02* (2006.01)

(52) U.S. Cl.

CPC ............... *B01J 37/04* (2013.01); *B01J 37/30* (2013.01); *B01J 37/343* (2013.01); *C01B 39/026* (2013.01); *B01D 2255/20761* (2013.01); *B01D 2255/20792* (2013.01); *B01D 2255/50* (2013.01); *B01D 2257/404* (2013.01); *B01D 2258/0283* (2013.01); *C01P 2004/03* (2013.01)

(58) Field of Classification Search

CPC ......... B01D 2258/0283; B01D 53/8628; B01J 29/76; B01J 37/009; B01J 37/031; B01J 37/04; B01J 37/30; B01J 37/343; B01J 35/30; C01B 39/026; C01P 2004/03

See application file for complete search history.

(56) References Cited

FOREIGN PATENT DOCUMENTS

WO WO-2018221194 A1 * 12/2018 ............. B01D 53/94
WO WO-2022214655 A1 * 10/2022 .............. B01J 37/10

OTHER PUBLICATIONS

Xu et al. ACS Catal. 2020, 10, 6197-6212 (Year: 2020).*
Xu et al. ACS Catal. 2020, 10, 6197-6212, Supporting Information (Year: 2020).*
Song et al. CN109534354A English (Year: 2019).*
Takagi et al. WO2018221194A1 English (Year: 2018).*

* cited by examiner

Cu—Zn-SSZ-13 MOLECULAR SIEVE COMPOSITE CATALYST AND PREPARATION METHOD THEREOF

CROSS REFERENCE TO RELATED APPLICATION

This application claims takes priority from and claims the benefit of Chinese Patent Application No. 202211653966.6 filed on Dec. 22, 2022, the contents of which are herein incorporated by reference.

TECHNICAL FIELD

The present disclosure belongs to the field of catalysts, and particularly relates to a Cu—Zn-SSZ-13 molecular sieve composite catalyst and a preparation method thereof.

BACKGROUND

According to estimates, there are more than 11 million heavy-duty vehicle holdings in China, accounting for only 4.4% of vehicle holdings of China, but the nitrogen oxides and particulate matters emitted by them reach 85% and 65% of the total vehicle emissions respectively. Therefore, since July 2021, China VI emission standards for diesel fueled heavy-duty vehicles have been implemented nationwide, which indicates that the vehicles of China have entered the era of China VI emission standards in an all-round way and basically achieved the integration with developed countries in Europe and America.

With the increasingly stringent emission standards of motor vehicle exhaust, especially diesel vehicle exhaust, ammonia selective catalytic reduction ($NH_3$—SCR) technology has been widely applied into a diesel vehicle exhaust post-processing system to eliminate emission of nitrogen oxides. A SSZ-13 molecular sieve catalyst is chosen as the latest generation of $NH_3$—SCR catalyst because of its excellent catalytic performance and good hydrothermal stability.

Cu-SSZ-13 zeolite has attracted much attention in its synthesis, preparation and process optimization for its excellent catalytic performance exhibited in a $NH_3$—SCR reaction. The preparation of Cu-SSZ-13 is usually carried out by a two-step synthesis method such as an ion exchange method or an impregnation method, but a one-step synthesis method is simpler and more efficient compared with the two-step method. The one-step synthesis method refers to adding a copper source directly into a synthesized gel of SSZ-13 zeolite, and introducing Cu onto a CHA skeleton in situ through hydrothermal crystallization. It avoids a complex process in the later period, such as an ion exchange or impregnation process. Up to now, TMAdaOH is the most effective organic structure-directing agent for synthesizing SSZ-13, but this template agent is expensive, which leads to the high cost of a synthetic product. In the past decades, researchers have been devoted to the exploration of synthesizing SSZ-13 with high efficiency and low cost.

Xiao Fengshou et al. have synthesized Cu-SSZ-13 in situ in one step by using a new cheap complex Cu-TEPA as a template agent and a copper source, which avoids the use of an expensive template agent, N,N,N,-trimethyl-1-adamantyl ammonium hydroxide cation (TMAdaOH) and reduces the synthesis cost. However, the resultant product has a very high copper content, and contains a lot of sodium ions, which is not conducive to the $NH_3$—SCR reaction. Thereafter, He Hong et al. have used ammonium nitrate to reverse-exchange the directly synthesized Cu-SSZ-13 to obtain an appropriate copper content studied the catalytic activity of the zeolite, and have found that the sample has excellent $NH_3$—SCR catalytic performance and relatively higher $N_2$ selectivity at 150-550° C. However, currently the use of ammonium nitrate in China is limited and it has a great impact on the ecological environment, and the activity of the resultant catalyst needs to be further improved. Therefore, it is of great significance for denitration of mobile source exhaust and environmental protection to prepare a SSZ-13 molecular sieve catalyst with higher activity and better hydrothermal stability by using more convenient and easily available exchange reagents.

Therefore, based on this, the technical solution of the present disclosure is proposed.

SUMMARY

The present disclosure aims to solve problems in the prior art, such as the high cost of an employed expensive template agent N,N,N,-trimethyl-1-adamantyl ammonium hydroxide cation (TMAdaOH), a complicated ion exchange or impregnation process in the later period and the limited ammonium nitrate, as well as a great impact on the environment. The present disclosure provides a Cu—Zn-SSZ-13 molecular sieve composite catalyst and a preparation method thereof. In the preparation method, firstly in situ synthesis is conducted by an one-step method, and a template agent TMAdaOH (using copper-zinc-tetraethylenepentamine as the template agent) is removed; then a processed diatomite filter aid containing a SSZ-13 molecular sieve seed is added to improve the molecular sieve yield and thus reduce the synthesis cost; and finally, the Cu—Zn-SSZ-13 molecular sieve composite catalyst is prepared by substituting ammonium nitrate with ammonium dihydrogen phosphate or diammonium hydrogen phosphate through a counter-ion exchange method. The reaction performance of the catalyst in a temperature range of 100-600° C. is better than that of a SSZ-13 catalyst prepared by an ion exchange method and a Cu-SSZ-13 molecular sieve catalyst prepared by an one-step method, and the yield of the synthetic object is increased by 40%.

The present disclosure provides a method for preparing a Cu—Zn-SSZ-13 molecular sieve composite catalyst, which includes the following steps:

(1) adding a SSZ-13 molecular sieve seed into an ammonia water solution, stirring uniformly, then adding a diatomite filter aid, and sequentially stirring, allowing to stand, centrifuging or separating by suction filtration to obtain a pre-processed SSZ-13 molecular sieve seed;

(2) dissolving a copper source and a zinc source in water, then adding tetraethylenepentamine and stirring to obtain a first mixed solution;

(3) adding an aluminum source and sodium hydroxide into water, and dissolving under stirring to obtain a second mixed solution;

(4) mixing the first mixed solution of the step (2) with the second mixed solution of the step (3), then adding a silicon source and stirring to obtain a third mixed solution;

(5) adding the pre-processed SSZ-13 molecular sieve seed of the step (1) into the third mixed solution of the step (4), stirring, charging into a reaction kettle for crystallization, and cooling to normal temperature after the crystallization is completed to obtain a fourth mixed solution;

(6) conducting centrifugation or separation by suction filtering on the fourth mixed solution of the step (5), discarding the supernatant, continually adding water to the remaining solid, sequentially performing ultrasonication, centrifugation or separation by suction filtration, and repeating these operations for 3-4 times until the pH of the supernatant is 7-8;

(7) discarding the supernatant with a pH of 7-8, and oven-drying and grinding the remaining solid to obtain a powder solid; and (8) carrying out ion exchange on the powder solid of the step (7) and an ammonium dihydrogen phosphate or diammonium hydrogen phosphate solution, centrifuging or separating by suction filtration separation after completion of the ion exchange, and sequentially oven-drying and roasting the obtained solid to obtain the Cu—Zn-SSZ-13 molecular sieve composite catalyst.

Preferably, in the step (1), the pH of the ammonia water solution is 9-10, a stirring time is 1-1.5 h, and a standing time is 30-40 min.

Preferably, in the step (2), the copper source is one of copper acetate, copper sulfate or copper nitrate; and the zinc source is one of zinc sulfate or zinc nitrate.

Preferably, in the step (3), the aluminum source is one of sodium metaaluminate, aluminum sulfate, aluminum hydroxide or pseudo-boehmite.

Preferably, in the step (4), the silicon source is one of tetraethyl orthosilicate, silica sol, macroporous silica gel or water glass.

Preferably, a molar ratio of the aluminum source, the silicon source, the sodium hydroxide, the copper source, the zinc source and the tetraethylenepentamine is 0.05:1:0.15:0.04:0.04:0.08.

Preferably, in the step (5), the crystallization is conducted at a temperature of 140-160° C. for a time of 96-120 h.

Preferably, in the step (8), a concentration of the ammonium dihydrogen phosphate or diammonium hydrogen phosphate solution is 1-1.5 mol/L.

Preferably, in the step (8), the oven-drying is conducted at a temperature of 80-100° C. for a time of 7-9 h; and the roasting is conducted at a temperature of 600-650° C. for a time of 6-7 h.

Based on the same technical concept, the present disclosure further provides a Cu—Zn-SSZ-13 molecular sieve composite catalyst prepared by the aforementioned method.

Beneficial effects of the present disclosure are as follows.

In the preparation method of the present disclosure, the Cu—Zn-SSZ-13 molecular sieve composite material can be synthesized only by an one-step method, which does not need the ion exchange or impregnation method with complexed processes and uses copper-zinc-tetraethylenepentamine as the template agent to replace the expensive existing template agent N,N,N,-trimethyl-1-adamantyl ammonium hydroxide cation (TMAdaOH), greatly reducing the synthesis cost. Furthermore, the processed diatomite filter aid containing the SSZ-13 molecular sieve seed is further added in the preparation process to improve the molecular sieve yield, which can further reduce the synthesis cost. Finally, the Cu—Zn-SSZ-13 molecular sieve composite catalyst is prepared by substituting ammonium nitrate with ammonium dihydrogen phosphate or diammonium hydrogen phosphate through a counter-ion exchange method, which solves the problem that currently the use of ammonium nitrate is limited in China and has a great impact on the ecological environment.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and those of ordinary skills in the art may still derive other drawings from these accompanying drawings without creative efforts.

DETAILED DESCRIPTION OF THE EMBODIMENTS

Figure 1:
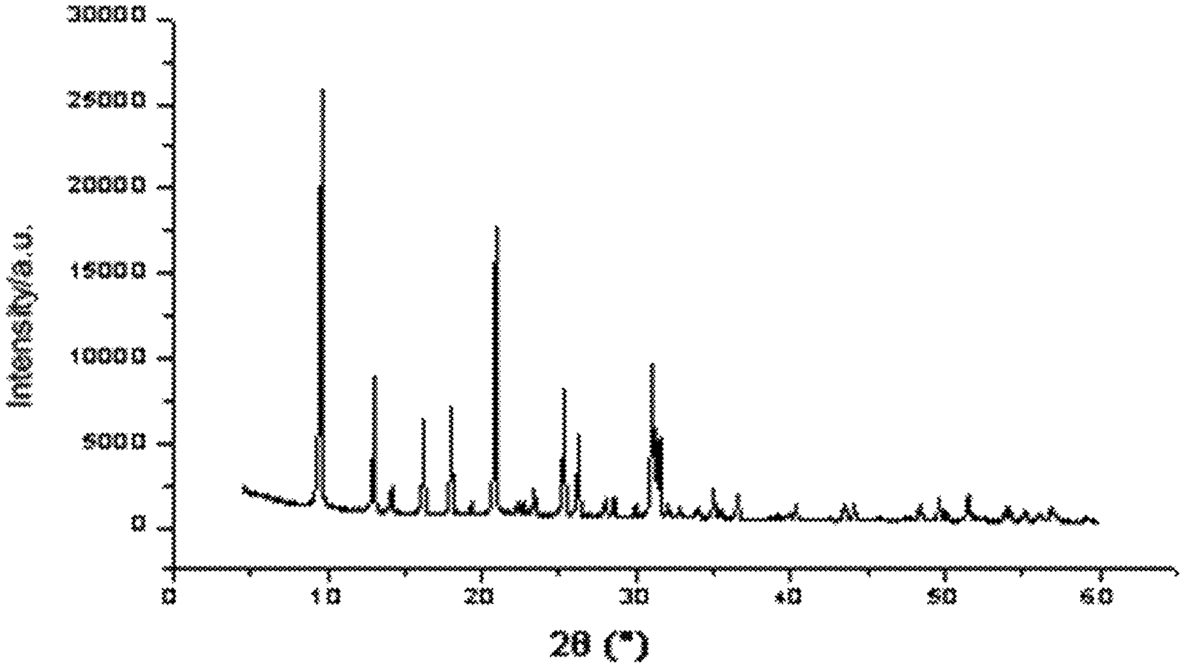
FIG. 1 is an XRD spectrogram of a Cu—Zn-SSZ-13 molecular sieve composite catalyst obtained in Example 1.

In order to make the objects, technical solutions and advantages of the present disclosure more clear, the technical solutions of the present disclosure will be described in detail below. Apparently, the described embodiments are merely a part rather than all of the embodiments of the present disclosure. All other embodiments obtained by those of ordinary skills in the art based on the embodiments of the present disclosure without creative efforts are within the claimed scope of the present disclosure.

Example 1

This example provided a method for preparing a Cu—Zn-SSZ-13 molecular sieve composite catalyst, which included the following steps:

(1) weighing 200 mL of water and adjusting its pH to 9 with ammonia water, then adding 1 g of a commercial SSZ-13 molecular sieve seed and stirring evenly, continually adding 10 g of a diatomite filter aid, and sequentially stirring for 1 h, allowing to stand for 30 min and separating by centrifugation to obtain a pre-processed SSZ-13 molecular sieve seed;

(2) adding and dissolving 9.523 g of a copper source and 10.966 g of a zinc source in 42.838 g of water, and then slowly dropwise adding 14.438 g of tetraethylenepentamine and stirring to obtain a first mixed solution;

(3) additionally taking 42.838 g of water, adding 9.47 g of an aluminum source and 11.441 g of sodium hydroxide, and dissolving under stirring to obtain a second mixed solution;

(4) mixing the first mixed solution with the second mixed solution under stirring for 1 h, then adding 143.225 g of a silicon source and stirring for 4 h to obtain a third mixed solution;

(5) adding the pre-processed SSZ-13 molecular sieve seed into the third mixed solution, stirring, then charging into a reaction kettle (the filling degree of the reaction kettle being 60%), crystallizing at 140° C. for 120 h, and cooling to normal temperature after the crystallization was completed to obtain a fourth mixed solution;

(6) centrifugally separating the fourth mixed solution, discarding the supernatant, continually adding water to the remaining solid, sequentially performing ultrasonication for 10 min and centrifugal separation, and repeating these operation for 3-4 times until the pH of the supernatant was 7;

(7) discarding the supernatant with the pH of 7, and oven-drying and grinding the remaining solid at 80° C. to obtain powder solid; and (8) carrying out ion exchange on the powder solid and a 1 mol/L ammonium dihydrogen phosphate solution at 80° C. for 3 times, each time for 6 h, centrifugally separating after the ion exchange was completed, and sequentially oven-drying the obtained solid at a condition of 80° C. for 9 h and roasting the solid at 600° C. for 7 h to obtain the Cu—Zn-SSZ-13 molecular sieve composite catalyst after completion.

Example 2

This example provided a method for preparing a Cu—Zn-SSZ-13 molecular sieve composite catalyst, which included the following steps:

(1) weighing 200 mL of water and adjusting its pH to 10 with ammonia water, then adding 1 g of a commercial SSZ-13 molecular sieve seed and stirring evenly, continually adding 10 g of a diatomite filter aid, and sequentially stirring for 1.5 h, allowing to stand for 40 min and separating by suction filtration to obtain a pre-processed SSZ-13 molecular sieve seed;

(2) adding and dissolving 9.523 g of a copper source and 10.966 g of a zinc source in 42.838 g of water, and then slowly dropwise adding 14.438 g of tetraethylenepentamine and stirring to obtain a first mixed solution;

(3) additionally taking 42.838 g of water, adding 9.47 g of an aluminum source and 11.441 g of sodium hydroxide, and dissolving under stirring to obtain a second mixed solution;

(4) mixing the first mixed solution with the second mixed solution under stirring for 1 h, then adding 143.225 g of a silicon source and stirring for 4 h to obtain a third mixed solution;

(5) adding the pre-processed SSZ-13 molecular sieve seed into the third mixed solution, stirring, then charging into a reaction kettle (the filling degree of the reaction kettle being 80%), crystallizing at 160° C. for 96 h, and cooling to normal temperature after the crystallization was completed to obtain a fourth mixed solution;

(6) separating the fourth mixed solution by suction filtration, discarding the supernatant, continually adding water to the remaining solid, sequentially performing ultrasonication for 10 min and separation by suction filtration, and repeating these operation for 3-4 times until the pH of the supernatant was 8;

(7) discarding the supernatant with the pH of 8, and oven-drying and grinding the remaining solid at 80° C. to obtain powder solid; and (8) carrying out ion exchange on the powder solid and a 1 mol/L diammonium hydrogen phosphate solution at 80° C. for 3 times, each time for 6 h, separating by suction filtration after the ion exchange was completed, and sequentially oven-drying the obtained solid at a condition of 100° C. for 7 h and roasting the solid at 650° C. for 6 h to obtain the Cu—Zn-SSZ-13 molecular sieve composite catalyst after completion.

In order to characterize the performance of the Cu—Zn-SSZ-13 molecular sieve composite catalyst of the present disclosure, the following tests were carried out.

Figure 2:
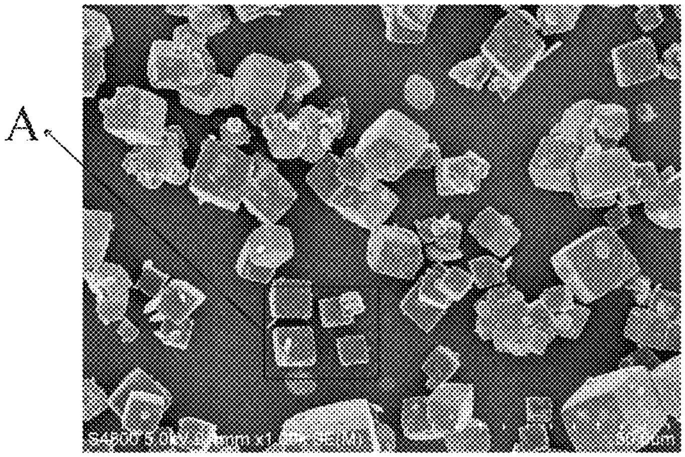
FIG. 2 is an SEM spectrogram of the Cu—Zn-SSZ-13 molecular sieve composite catalyst obtained in Example 1.
Figure 3:
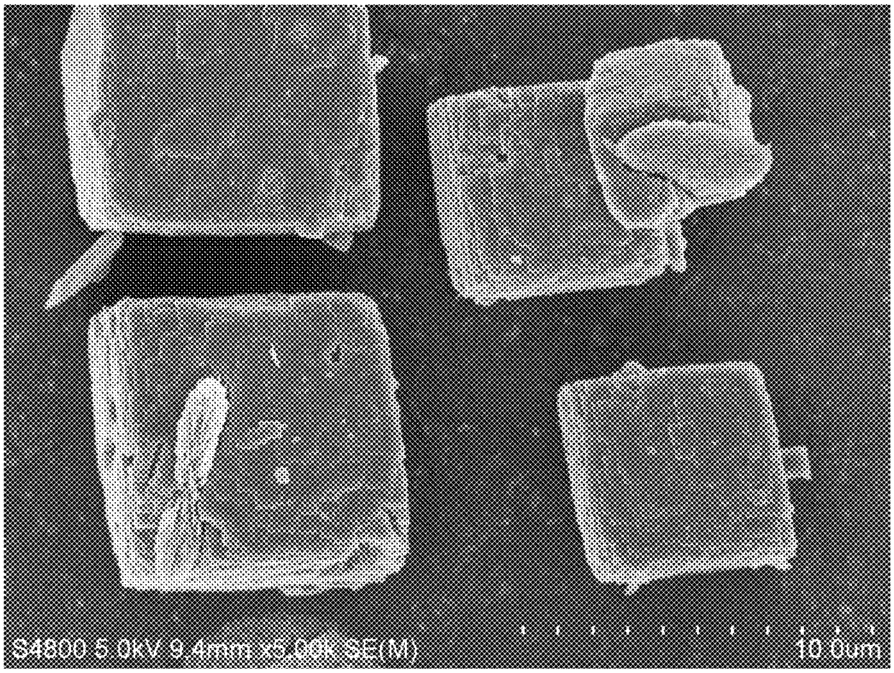
FIG. 3 is an enlarged view of a part A in FIG. 2.

1. The Cu—Zn-SSZ-13 molecular sieve composite catalyst obtained in Example 1 was tested by X-ray diffraction, and its XRD spectrogram was shown in FIG. 1. The results showed that the spectral line was flat without impurity peak, and the crystallinity was good.
2. The Cu—Zn-SSZ-13 molecular sieve composite catalyst obtained in Example 1 was tested by scanning electron microscopy. The SEM images were shown in FIGS. 2 and 3. The results showed that under the electron microscope, the crystal of the present disclosure had a regular crystal form, uniform particles, good dispersibility and had no agglomeration phenomenon.
3. On a device for evaluating SCR denitration catalyst performance, the Cu—Zn-SSZ-13 molecular sieve composite catalyst obtained in Example 1 was tested, and the composition of simulated flue gas was shown in Table 1, specifically: 500 ppm of NO, 500 ppm of $NH_3$, 5% $O_2$, and 92% of $N_2$ (balance gas). The space velocity (GHSV) is 90,000 $h^{-1}$, during evaluation of the catalyst, the catalyst was tableted and screened for particles of 20-40 meshes; the amount of catalyst filled in a reaction tube was 5 mL; a reaction temperature for evaluation ranged from 100-600° C., the tail gas was detected every 50° C. and the data was recorded by a flue gas analyzer.

TABLE 1

| Composition of simulated flue gas | | | | |
|---|---|---|---|---|
| Ingredients of simulated flue gas | $N_2$ | $O_2$ | NO (with a concentration of 3% by volume) | $NH_3$ (with a concentration of 3% by volume) |
| Proportion | 92% | 5% | 500 ppm | 500 ppm |

Figure 4:
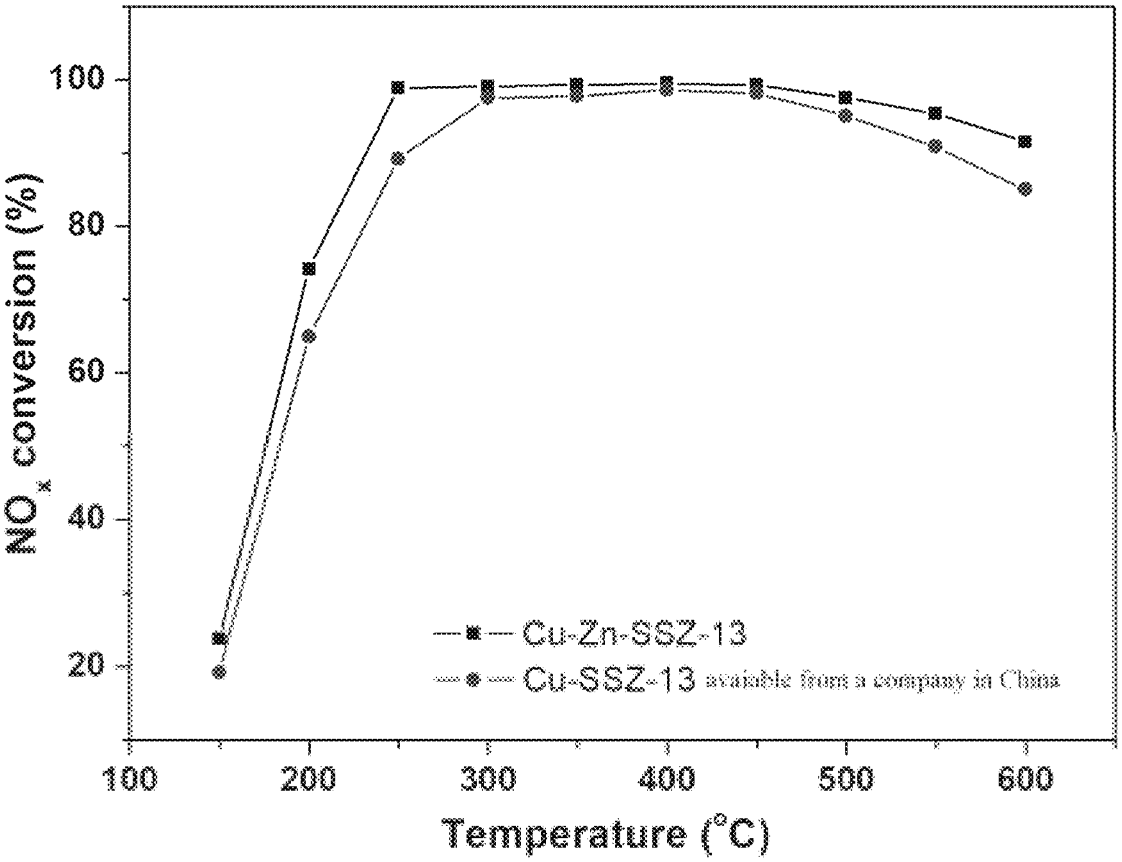
FIG. 4 is a diagram showing the $NH_3$—SCR reaction activity of the catalyst.

The $NH_3$—SCR reaction activity diagram of the Cu—Zn-SSZ-13 molecular sieve composite catalyst was shown in FIG. 4. The results showed that the NOx conversion rate of the Cu—Zn-SSZ-13 molecular sieve composite catalyst was about 98% in the temperature range of 250-500° C., and the conversion rate of the sample could still be maintained at 92% when the reaction temperature was risen to 600° C., indicating that the Cu—Zn-SSZ-13 molecular sieve composite catalyst had good catalytic activity. Compared with domestic products of the same type, the reaction activity of the catalyst all had advantages in a temperature interval of 150-600° C.

Additionally, the low cost was also an advantage of the present disclosure, and the cost comparison was shown in Table 2.

TABLE 2

| Cost comparison (based on sales price) | | | |
|---|---|---|---|
| Type | Imported product of the same type | Commercially available product of the same type | The product of the present disclosure |
| Price | 400,000-450,000 RMB/ton | 300,000-350,000 RMB/ton | 180,000-200,000 RMB/ton |

As could be seen from Table 2, the cost of the present disclosure is far lower than that of the imported and commercially available products of the same type, and thus the present disclosure has better popularization value.

The above is only a specific embodiment of the present disclosure, but the scope of the present disclosure is not limited thereto, and changes or substitutions can easily come into the mind of those skilled in the art within the technical scope disclosed by the present disclosure. These changes or substitutions shall fall into the claimed scope of the present disclosure. Therefore, the claimed scope of the present disclosure should be determined by the claimed scope of the appended claims.

What is claimed is:

1. A method for preparing a Cu—Zn-SSZ-13 molecular sieve composite catalyst, comprising the following steps:

(1) adding a SSZ-13 molecular sieve seed into an ammonia water solution, stirring uniformly, then adding a diatomite filter aid, and sequentially stirring, allowing to stand, centrifuging or separating by suction filtration to obtain a pre-processed SSZ-13 molecular sieve seed;

(2) dissolving a copper source and a zinc source in water, then adding tetraethylenepentamine and stirring to obtain a first mixed solution;

(3) adding an aluminum source and sodium hydroxide into water, and dissolving under stirring to obtain a second mixed solution;

(4) mixing the first mixed solution of the step (2) with the second mixed solution of the step (3), then adding a silicon source and stirring to obtain a third mixed solution;

(5) adding the pre-processed SSZ-13 molecular sieve seed of the step (1) into the third mixed solution of the step (4), stirring, charging into a reaction kettle for crystallization, and cooling to normal temperature after the crystallization is completed to obtain a fourth mixed solution;

(6) conducting centrifugation or separation by suction filtering on the fourth mixed solution of the step (5), discarding the supernatant, continually adding water to the remaining solid, sequentially performing ultrasonication, centrifugation or separation by suction filtration, and repeating these operations for 3-4 times until the pH of the supernatant is 7-8;

(7) discarding the supernatant with a pH of 7-8, and oven-drying and grinding the remaining solid to obtain a powder solid; and (8) carrying out ion exchange on the powder solid of the step (7) with an ammonium dihydrogen phosphate or diammonium hydrogen phosphate solution, centrifuging or separating by suction filtration separation after completion of the ion exchange, and sequentially oven-drying and roasting the obtained solid to obtain the Cu—Zn-SSZ-13 molecular sieve composite catalyst.

2. The preparation method according to claim 1, wherein in the step (1), the pH of the ammonia water solution is 9-10, a stirring time is 1-1.5 h, and a standing time is 30-40 min.

3. The preparation method according to claim 1, wherein in the step (2), the copper source is one of copper acetate, copper sulfate or copper nitrate; and the zinc source is one of zinc sulfate or zinc nitrate.

4. The preparation method according to claim 1, wherein in the step (3), the aluminum source is one of sodium metaaluminate, aluminum sulfate, aluminum hydroxide or pseudo-boehmite.

5. The preparation method according to claim 1, wherein in the step (4), the silicon source is one of tetraethyl orthosilicate, silica sol, macroporous silica gel or water glass.

6. The preparation method according to claim 1, wherein a molar ratio of the aluminum source, the silicon source, the sodium hydroxide, the copper source, the zinc source and the tetraethylenepentamine is 0.05:1:0.15:0.04:0.04:0.08.

7. The preparation method according to claim 1, wherein in the step (5), the crystallization is conducted at a temperature of 140-160° C. for a time of 96-120 h.

8. The preparation method according to claim 1, wherein in the step (8), a concentration of the ammonium dihydrogen phosphate or diammonium hydrogen phosphate solution is 1-1.5 mol/L.

9. The preparation method according to claim 1, wherein in the step (8), the oven-drying is conducted at a temperature of 80-100° C. for a time of 7-9 h; and the roasting is conducted at a temperature of 600-650° C. for a time of 6-7 h.

* * * * *